Patented Nov. 3, 1953

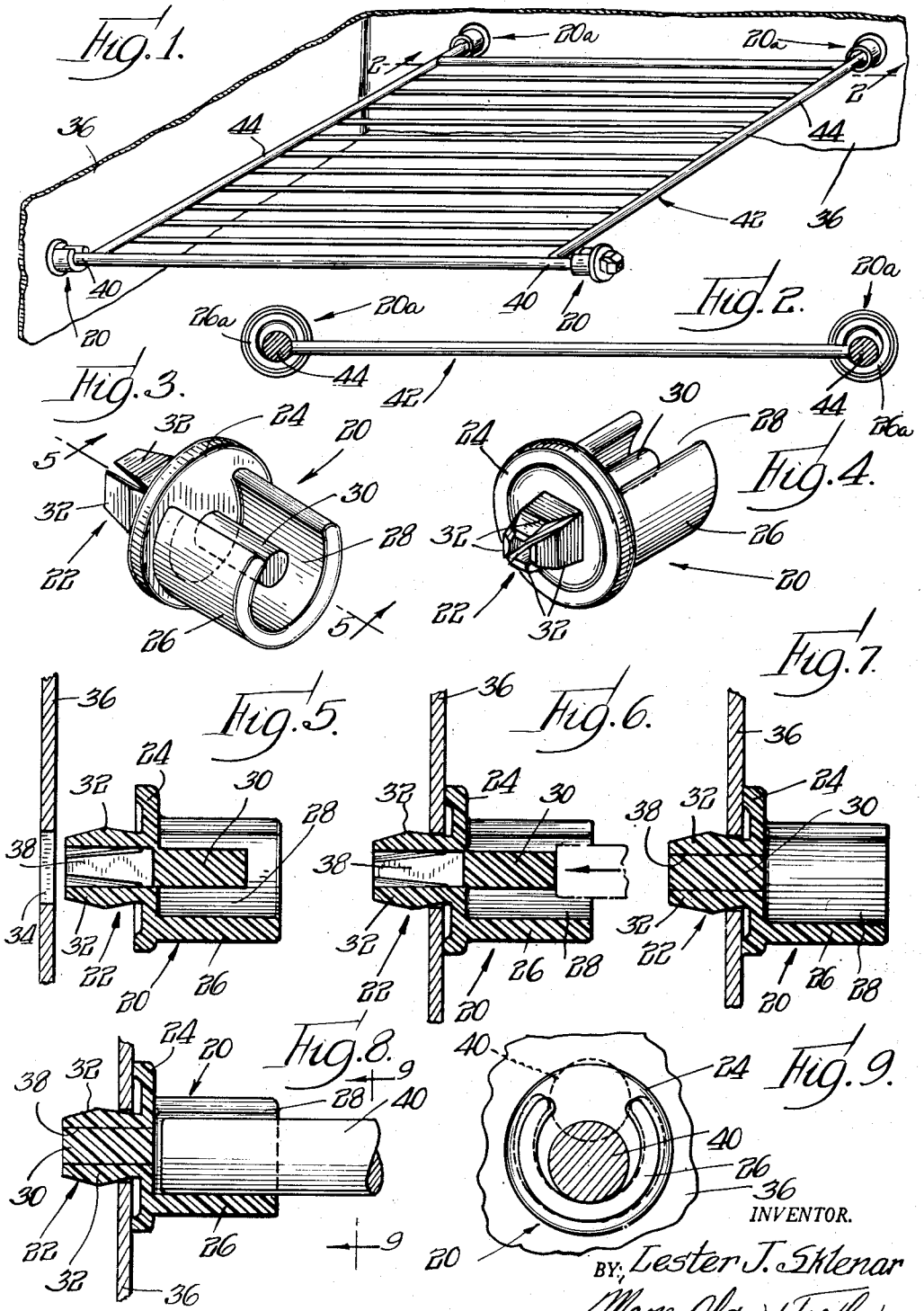
Nov. 3, 1953 — L. J. SKLENAR — 2,657,894
DRIVE FASTENER SUPPORT
Filed Feb. 25, 1950 — 2 Sheets-Sheet 1
INVENTOR.
BY Lester J. Sklenar
Moore, Olson & Trexler
attys.

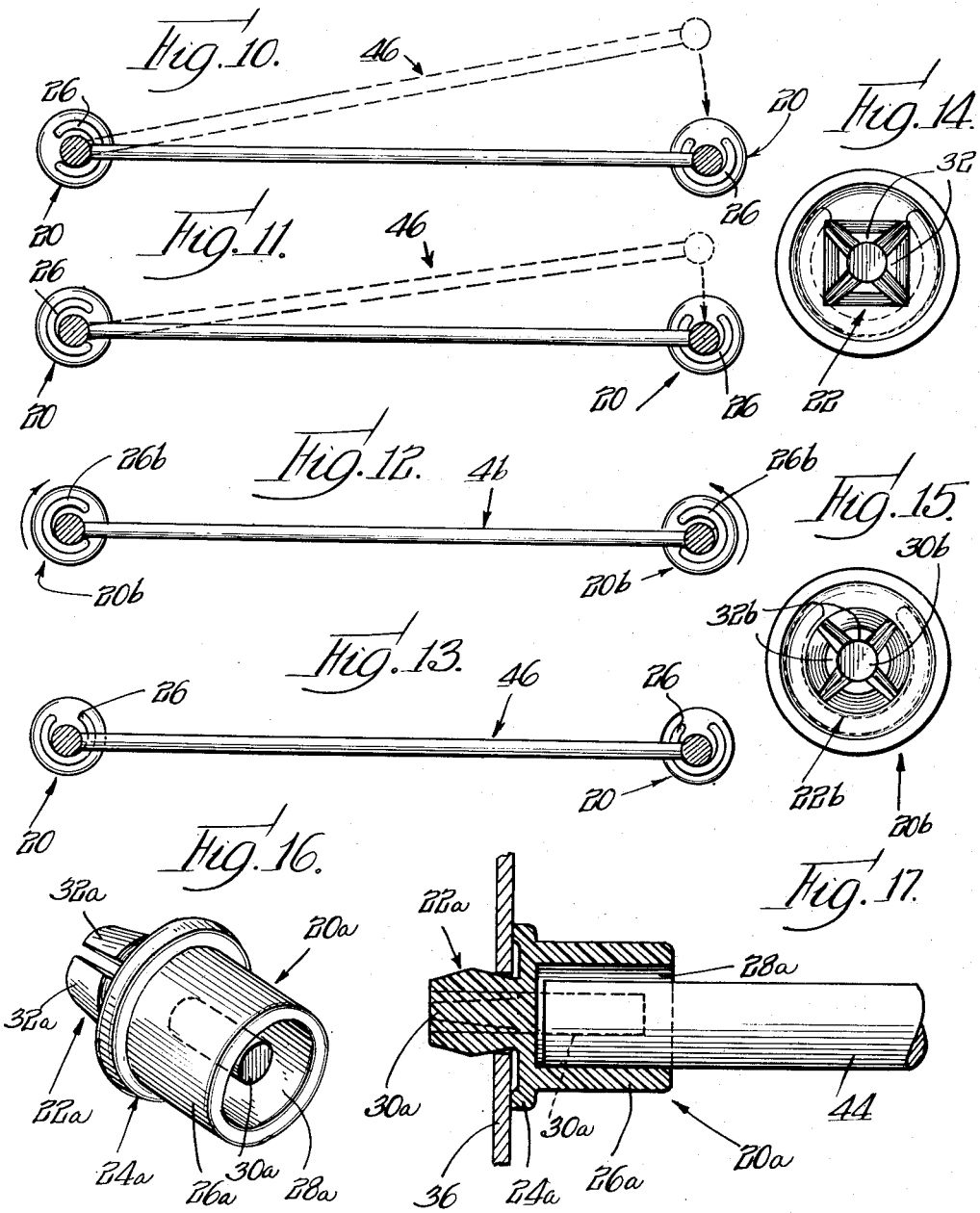

2,657,894

UNITED STATES PATENT OFFICE 2,657,894

DRIVE FASTENER SUPPORT

Lester J. Sklenar, Chicago, Ill., assignor to Illinois Tool Works, Chicago, Ill., a corporation of Illinois Application February 25, 1950, Serial No. 146,295

9 Claims. (Cl. 248—239)

This invention relates generally to snap-in type work supports, and more particularly to fasteners of this class wherein a centrally apertured transversely yieldable shank thereof is adapted to accommodate an element driven axially into the shank aperture for securing the support in position upon a work piece.

One of the disadvantages in the use of snap-in type work supports employing pins adapted to be driven into the shank aperture is that this pin, prior to being driven into the shank, is constantly exposed to breakage and possible separation from the remaining portion of the fastener. That is to say, in a number of the fasteners of this general class now available on the market, the aforesaid driving pin normally extends beyond the confines of the work supporting structure of the fastener, and hence is constantly subjected to the potential hazard of being broken or dislodged, particularly in the course of transporting the fasteners from the place of manufacture to the point of ultimate use. It is therefore one of the important objects of the present invention to overcome the above mentioned and other disadvantages, and to this end the invention contemplates the employment of the work supporting part of the fastener as an effective shield for the axially shiftable and centrally positioned locking element, as for example a pin, prior to the insertion of the fastener shank within a complementary aperture in a work sheet.

It is also an object of the present invention to provide a work supporting fastener of the type referred to above, wherein the work supporting structure thereof, after the axially shiftable locking element shielded thereby has been driven into the shank aperture, will serve as a very effective yet extremely light weight work support.

More specifically, the invention contemplates a work supporting fastener as outlined above, wherein the work supporting structure thereof provides an axially extending compartment in which the longitudinally driven locking member is normally housed and protected, such compartment serving to reduce to a minimum the amount of material necessary for the work support and also, in instances where desirable, to accommodate a work piece.

It is a further object of the present invention to provide a fastener as set forth above incorporating an axial compartment which may be circumferentially enclosed and open at one end or may be open-sided for accommodating a work part, such as a support rod or the like.

In addition to the foregoing, the present invention contemplates a combined fastener and work support wherein the longitudinally shiftable locking member or pin is protectively housed by the work supporting part, and also wherein the entire combination is formed integral and adapts itself for plastic molding.

The foregoing and other objects and advantages will be more apparent from the following description when considered in connection with the accompanying drawings, wherein—

Fig. 1 is a fragmentary perspective view illustrating a refrigerator shelf mounted within work supporting fasteners of the type contemplated by the present invention;

Fig. 2 is an enlarged horizontal transverse sectional view taken substantially along the line 2—2 of Fig. 1;

Fig. 3 is a perspective view of one of the open-sided work supporting fasteners of Fig. 1, as viewed from the work supporting end thereof;

Fig. 4 is another perspective view of the work supporting fastener shown in Fig. 3, viewing said fastener from the shank or work fastening end thereof;

Fig. 5 is a longitudinal vertical sectional view taken substantially along the line 5—5 of Fig. 3, showing the fastener in position to be inserted within the complementary aperture of a work sheet;

Fig. 6 is a view similar to Fig. 5 illustrating the shank of the fastener initially snapped into the work aperture prior to the insertion of the locking pin within the shank aperture;

Fig. 7 is a sectional view similar to Figs. 5 and 6 disclosing the locking pin driven into the shank aperture so as to lock said fastener in work supporting position;

Fig. 8 is a view similar to Fig. 7 showing one extremity of a shelf rod of Fig. 1 supported thereby;

Fig. 9 is a vertical sectional view taken substantially along the line 9—9 of Fig. 8, more clearly to illustrate the manner in which the shelf rod may be inserted within the open-sided work support;

Fig. 10 illustrates the manner in which a rod or shelf may first be inserted from the side of the work supporting fastener at the left, and subsequently lowered into the upwardly facing open side of the fastener shown at the right;

Fig. 11 is a view similar to Fig. 10 disclosing the manner in which the shelf rod may first be inserted in the right side of the fastener shown to the left of the figure, and then lowered into the upwardly facing open side of a complementary fastener;

Fig. 12 is a view similar to Figs. 10 and 11 disclosing the manner in which the rotation of the fasteners within the complementary work apertures serves to embrace shelf rods and the like;

Fig. 13 illustrates side rods of a shelf structure supported within fasteners in which the work supporting part thereof has the open side portion facing upwardly;

Fig. 14 is an enlarged end view of the shank portion of the fastener which may be used in the applications illustrated in Figs. 10 and 11, said shank being insertable within an aperture of polygonal shape;

Fig. 15 is an end view similar to Fig. 14 disclosing a fastener having a round shank insertable within correspondingly circular apertures, whereby to facilitate rotating the fasteners as illustrated by the directional arrows in Fig. 12;

Fig. 16 is a perspective view of a modified form of fastener; and

Fig. 17 is a central longitudinal sectional view of the fastener of Fig. 16 secured within a work piece with one end of a rod carried within the cylindrical chamber provided thereby.

Referring now to the drawings more in detail wherein like numerals have been employed to designate similar parts throughout the various figures, it will be seen that one practical embodiment of the present invention is illustrated in the perspective views of Figs. 3 and 4. This work supporting fastener is designated generally by the numeral 20, and includes a shank 22 extending from one side of a head structure which includes a flange portion 24 and a work supporting section 26 extending axially from the flange 24 oppositely to the shank 22. Particular attention is directed to the fact that the work supporting section 26 is internally recessed to provide a compartment or chamber 28 which is partially enclosed or encircled by the wall of the section 26.

As will be seen from Figs. 3 to 6, inclusive, a locking element or pin 30 is formed integral with the flange 24 and is normally enclosed within the work supporting section 26 in spaced relation with respect to the inner peripheral wall of said section. In fact, the entire structure thus far defined, namely, the shank 22, the flange 24, the work supporting section 26, and the locking member or pin 30 may be formed integral as shown. The form of the device is such as to enable the fastener to be produced in one piece by practicing conventional plastic molding processes. One extremity of the pin 30 is joined integrally with the fastener body by an area of very limited cross-section which is readily fracturable or shearable when the pin is subjected to an axial blow, as illustrated in Fig. 6.

By having the pin 30 bounded by the walls of the work supporting section 26, the pin is guarded against the possibility of being peripherally engaged. Hence, the danger of pin breakage and loss before the fastener is applied to a work piece is reduced to a minimum. Likewise, by providing the recess or compartment 28, the amount of stock required to form the work supporting section 26 is also reduced materially.

The fastener shank 22 is centrally disposed and extends axially from the flange 24. In Figs. 1 to 9, inclusive, the shank 22 is polygonal in cross-section, namely, square. The shank is made up of four equally spaced laterally yieldable fingers 32 which are slightly spaced from each other, and these fingers taper toward their entering extremities to facilitate registration with a complementary square aperture 34 in a work piece or sheet 36, Fig. 5. The point of maximum diameter of the shank 22 is slightly larger than the corresponding diameter of the work aperture 34, so that when the shank is introduced in the aperture 34 the fingers must yield inwardly. As the flange 24 of the fastener is brought into engagement with the adjacent surface of the work sheet 36, Fig. 6, the fingers 32 automatically spring outwardly toward their normal position of repose, thereby temporarily retaining the fastener and its work supporting part in position. The pin 30 may now be driven into the central aperture 38 of the shank to the position illustrated in Fig. 7. In this position the pin 30 frictionally engages the inner surfaces of the fingers 32 and the inner periphery of the flange 34 to resist withdrawal of the pin, and completely fills the space before the fingers thereby preventing said fingers from collapsing. This serves to hold the fastener securely withing the aperture 34 of the work piece 36. When thus secured the pin 30 has been completely removed from its housing or work supporting section 26, thereby conditioning the compartment or chamber 28 for accommodating a work piece such as the rod 40 shown in Figs. 8 and 9. This rod could be any of a large variety of structures such, for example, as a curtain rod or one of the rods of a refrigerator shelf, Fig. 1, designated generally by the numeral 42. In this disclosure the work sheets 36 would form the interior walls of the refrigerator.

In connection with the use of the fastener 20 as a support for a curtain rod or a rod forming part of a frame of a refrigerator shelf, attention is directed to the importance of the open-sided arrangement of the supporting section 26. In Fig. 9 a dot and dash circle illustrates the position of the rod 40 as it is initially lowered into the open side of the section 26. It will be noted that the diameter of the rod 40 is slightly greater than the distance between the margins of the support 26 which define the open side thereof. Hence, it is necessary to force these margins apart in order to snap the rod 40 into the solid line position illustrated in Figs. 8 and 9. The resiliency of the fastener material such as one of the commercially available plastics, makes it possible to snap the rod 40 into supporting position within the compartment 28. In order for the rod 40 to be removed, it would again be necessary to spring the opposed margins of the supporting section 26 outwardly. Hence, once the rod 40 has been secured in supporting position, it cannot be removed without exerting a force sufficient to overcome the resiliency of the open-sided portions of the section 26. This is of extreme importance in instances where the rods, shelving or the like have a tendency to be easily dislodged.

Thus far the invention has been described in connection with a work supporting fastener of the open-sided type designed to receive a work member such as a rod or bar snapped into the work supporting compartment from the side thereof. The invention also contemplates a modified work supporting fastener designated generally by the numeral 20a, Figs 16 and 17.

This fastener 20a differs only from the fastener 20 previously described in two respects. In the first place, the work supporting section 26a is of cylindrical form so as to completely encircle the locking pin 30a and so as to present a compartment 28a which is open only at the outer end thereof. In the second place, the shank 22a made up of four equally spaced fingers 32a is circular in cross-section, as distinguished from the square or polygonal cross-section of the shank 22. It will be noted that shank 22a extends axially from one face of the flange 24a and the work supporting section 26a extends axially from the opposite side of the flange 24a. Fig. 16 is a perspective view disclosing the fastener before the shank thereof is inserted within the aperture of a work sheet. In Fig. 17 the fastener 20a is shown mounted within the work sheet 36 after the locking pin 30a has been driven into fastener securing position within the central aperture of the shank 22a. In this position a rod 44 is adapted to be inserted from the outer extremity of the work support 26a into the compartment 28a. In Fig. 1 these fasteners 20a are disclosed as supporting the rear extremities of the frame members of the shelf 42. In applying the shelf within the refrigerator bounded by the walls 36, the rear extremities of the shelf frame rods 44 are first inserted within the cylindrical openings or compartments 28a of the fasteners 20a, and the opposite extremities of the transverse rod 40 forming the forward margin of the shelf 42 are lowered and thereby snapped into position within the open-sided compartment 28 of the fasteners 20. Thus the shelf is secured in a fixed position by the use of fasteners of extremely simple form, yet of very sturdy construction.

Figs. 10 to 12, inclusive, illustrate diagrammatically various ways in which fasteners of the type previously described herein may be used. Fig. 10 discloses an arrangement wherein the work supporting fastener 20 at the left side is so positioned that the open side of the supporting section 26 faces to the left. The fastener 20 positioned on the right is so positioned that the open side of its work supporting section faces upwardly. Thus, in associating a frame designated generally by the numeral 46 with these fasteners, the rod at the left side of the frame is first snapped into the open side of the fastener 20, the frame being held at an angle illustrated by the dot and dash lines. After the left frame member has thus been snapped into position within the fastener, the frame member is swung downwardly so as to snap the frame member at the right margin of the shelf 46 into the fastener 20 positioned at the right of Fig. 10. In Fig. 11 the fastener 20 positioned at the left is positioned so that the open side of the supporting section 26 faces to the right, or in other words, toward the fastener 20 positioned at the right. In this arrangement the shelf 46 is snapped into position by pushing it to the left into the open side of the fastener, and then lowered so as to snap the opposite margin into the fastener 20 positioned at the right. In Fig. 12 fasteners designated generally by the numeral 20b are employed. This fastener is also illustrated in Fig. 15. The only manner in which the fastener 20b differs from the fastener 20 previously described is that the shank 22b is circular in cross-section, as distinguished from the square shank 22. By controlling the size of the work aperture, it is possible to fasten the fastener 20b in place so that even after the locking pin 30b thereof has been driven into the shank aperture, the fastener may be rotated within the work aperture. Thus, in instances where necessary, the shelf structure 46 of Fig. 12 may be lowered into the fasteners 20b when the open side of the work supporting structure 26b thereof is facing upwardly. Thereafter the fasteners 20b may be rotated in the direction indicated by the directional arrows in Fig. 12, so as to positively secure the shelf 46 against upward dislodgement.

Fig. 13 discloses the shelf 46 held by the fasteners 20. These fasteners 20, as previously described, have a work supporting section which is open sided and may be used in place of the fasteners 20a, if desired. When thus employed the open side faces upwardly to receive the shelf rod.

From the foregoing it will be apparent that the present invention contemplates a combined fastener and work support which is of extremely simple yet sturdy construction. Furthermore, it is capable of being produced in one-piece if made of plastic, and by employing a hollow work supporting section the amount of material required to make the fastener is greatly reduced and at the same time an effective protective housing for the locking pin is afforded. By having a structural arrangement whereby the locking pin after being driven into fastening association with a shank renders the compartment within the housing free to accommodate a member to be supported, a fastener is provided which lends itself for use as a support for rods and the like or any elongated element such as is commonly employed for curtain rods and in the fabrication of refrigerator shelves and the like. When thus employed it is an advantage to have circumferential width of the open side of the supporting section slightly less than the maximum diameter of the rod or elongated element of the shelf, as previously pointed out. The resiliency of the work supporting section in the vicinity of this side opening is sufficient to permit a rod to be snapped through the side opening of reduced width into the portion of the compartment having a maximum internal diameter greater than the circumferential width of the side opening.

Obviously the invention is not limited to the particular shank structure disclosed herein nor to the particular cross-sectional shape of the work support. In fact, the invention contemplates various modifications and changes without departing from the spirit and scope of the appended claims.

The invention is hereby claimed as follows:

1. A work supporting fastener comprising a centrally apertured laterally yieldable shank, and a head portion at one extremity thereof, said head portion including a flange extending radially outwardly from the base of said shank and a work supporting section extending in an axial direction from said flange, said work supporting section having an axially extending compartment, and elongated means normally housed within and spaced from the inner wall of said compartment and thereby protected against transverse forces tending to displace said elongated means, said elongated means being adapted to be driven axially from within said compartment into said shank aperture for expanding said shank into fastener securing position, said shank, said head portion, and said elongated means being formed integrally with one another.

2. A work supporting fastener comprising a shank including yieldable fingers to be snapped into a complementary work piece aperture and to grip one side of the work piece, a head including a flange extending radially outwardly from one end of the shank to grip the opposite side of the work piece, a work supporting section including a housing compartment extending axially from said flange oppositely from said shank and open at the outer end thereof, and a pin having one end thereof integrally secured to the inner periphery of the flange around the adjacent ends of the shank fingers by a readily fracturable connection, the remainder of said pin being housed within and protected by said compartment and having the opposite end thereof disposed within the open end of said compartment and protected by the wall thereof against accidental damage or breakage, said pin being engageable through the open end of the compartment for inward axial driving thereof to sever the fracturable connection and to shift the pin to a position between said fingers for maintaining the same in work piece gripping engagement.

3. A work supporting fastener as claimed in claim 2, wherein the wall of the compartment has an axial opening of a width less than the maximum width of the compartment to provide a slot having the sides thereof yieldable to permit the snap insertion of a work support.

4. A work supporting fastener as claimed in claim 3, wherein the fingers present a polygonal periphery to resist turning of the fastener in the work piece aperture whereby to maintain the slot in a predetermined position.

5. A work supporting fastener comprising a centrally apertured laterally yieldable shank, and a head portion at one extremity thereof, said head portion including a flange extending radially outwardly from the base of said shank and a work supporting section extending in an axial direction from said flange, said work supporting section having an axially extending compartment, an elongated pin having the inner extremity thereof integrally connected to the head adjacent the shank aperture by an area of limited cross-section which is readily fracturable when pressure is applied to the outer extremity of the pin, said pin being normally housed within and spaced from the inner wall of said compartment and thereby protected against transverse forces tending to displace the same and said pin being adapted to be driven axially to break the fracturable connection and permit the pin to be shifted from within said compartment into said shank aperture for expanding said shank into fastener securing position.

6. A work supporting fastener comprising an apertured shank including yieldable portions for gripping one side of a complementary apertured work piece, a head portion integral with the shank at one extremity thereof for engaging the opposite side of the work piece and including a flange extending radially outwardly from the shank, a work supporting section integral with the flange and extending in an axial direction from said flange and having an axially extending compartment open at its outer end, and elongated pin means spaced from the inner surface of said compartment and initially supported at its inner end adjacent said flange and in axial alignment with the shank aperture, the remaining portion of said pin means being disposed within the compartment for protection thereby against accidental damage or breakage and the outer end of the pin means being engageable through the open end of the compartment for inward driving thereof into the shank aperture to maintain the yieldable portions in work piece gripping position and thus leaving the compartment substantially free internally to receive a work support.

7. A work supporting fastener as claimed in claim 6, wherein the compartment has an axial opening along one side thereof to provide a slot having the sides thereof yieldable to permit the snap insertion of a work support, and wherein the pin means is substantially completely removed from the compartment when driven into the shank aperture to thus permit lateral insertion of the work support.

8. A work supporting fastener as claimed in claim 6, wherein the pin means is initially formed integral with the flange by a readily fracturable connection adapted to be broken for movement of the pin means inwardly of the shank aperture.

9. A work supporting fastener as claimed in claim 6, wherein the compartment has an axial opening along one side thereof and wherein the shank in the vicinity of the head portion is provided with a polygonal periphery to resist turning of the fastener in the work piece aperture whereby to maintain the opening in predetermined position.

LESTER J. SKLENAR.

References Cited in the file of this patent

UNITED STATES PATENTS

| Number | Name | Date |
|---|---|---|
| 572,778 | Stevenson | Dec. 8, 1896 |
| 2,141,892 | Wilson | Dec. 27, 1938 |
| 2,179,603 | Tinnerman | Nov. 14, 1939 |
| 2,424,602 | De Swart | July 29, 1947 |
| 2,542,144 | Kearns | Feb. 20, 1951 |